F. A. HELMECKE.
Pumps.
No. 206,448. Patented July 30, 1878.
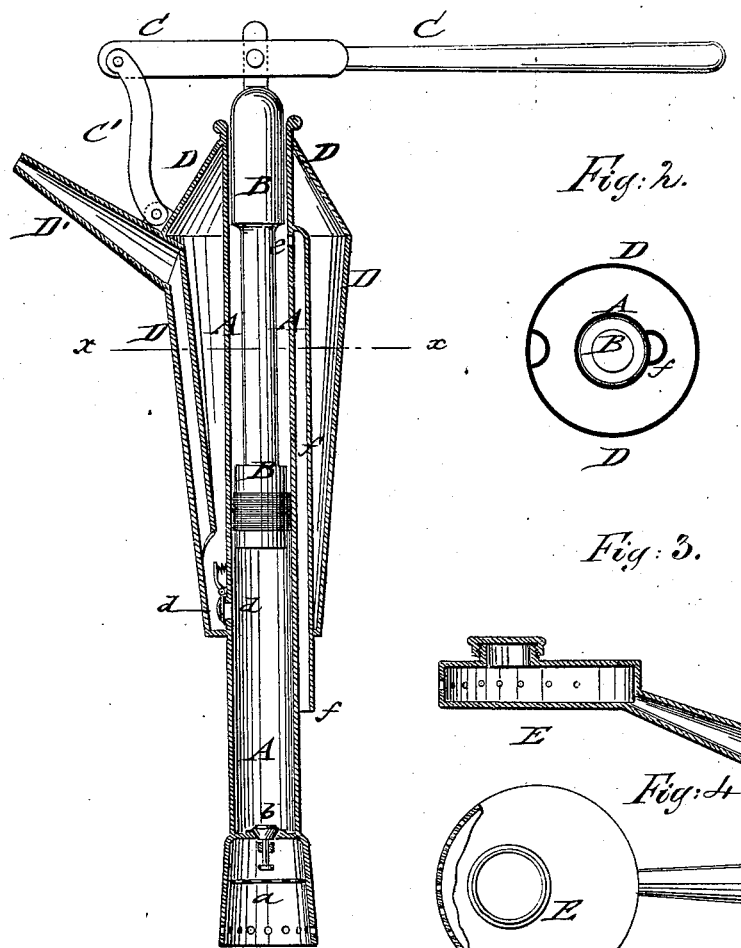

UNITED STATES PATENT OFFICE.

FRIEDERICH A. HELMECKE, OF ROUND TOP, TEXAS.

IMPROVEMENT IN PUMPS.

Specification forming part of Letters Patent No. 206,448, dated July 30, 1878; application filed June 7, 1878.

*To all whom it may concern:*

Be it known that I, FRIEDERICH A. HELMECKE, of Round Top, in the county of Fayette and State of Texas, have invented a new and Improved Pump, of which the following is a specification:

In the accompanying drawing, Figure 1 represents a vertical central section of my improved pump; Fig. 2, a horizontal section of the same on the line $x\ x$, Fig. 1; and Figs. 3 and 4 are a detail vertical central section and top view of a distributing-nozzle of the pump.

Similar letters of reference indicate corresponding parts.

The object of this invention is to furnish, for the purpose of sprinkling liquid poison on cotton-plants, as well as for sprinkling and watering purposes, and for extinguishing fires, an improved pump of simple and effective construction, that may be operated with great facility, and used in connection with any suitable receptacle.

The invention consists of an interior cylindrical barrel, and of a solid lever-acted plunger, with a conical surrounding air-chamber, having a discharge-spout and a spring-acted valve, that works in connection with the plunger and a bottom valve of the pump-barrel. The pump-barrel is provided with overflow-holes and a drain pipe or channel, to prevent the splashing out of the liquid at the top of the pump.

Referring to the drawing, A represents the pump-barrel, which is provided at the lower part with a conically-enlarged portion having a strainer, $a$, the enlarged part being perforated, to readily admit the liquid from the bucket or other receptacle.

The pump-barrel is provided above the strainer with a valve, $b$, through which the liquid is drawn up into the pump-barrel by means of a solid plunger, B, which is provided at the lower part with a suitable packing, to fit tightly into the cylindrical pump-barrel A.

To the upper end of the plunger is pivoted a hand-lever, C, which is, at its front end, again pivoted to two connecting-links, C', which are hinged to the exterior casing D of the pump, which forms an air-chamber around the pump-barrel. The casing D is made of conical shape, and communicates at its lower part with the barrel A by a hinged and spring-acted flap-valve, $d$, below the lower end of the plunger, through which the liquid that has been drawn up by the upward stroke of the plunger is forced into the air-chamber on the downward stroke of the plunger.

The outer air-chamber is provided with a spout, D', that is extended at the inside of the air-chamber downward toward valve $d$, and provided with a suitable nozzle, E, according to the purpose for which the pump is to be used. If used for killing insects on cotton-plants, a sprinkler with a number of radial holes and a detachable screw-cap, that admits the cleaning of the holes, may be used, while for watering plants and sprinkling generally a nozzle of flat segmental shape is used, while for other purposes a nozzle of the usual shape may be employed.

The enlarged air-chamber that encircles or surrounds the upper part of the pump-barrel, as shown in Fig. 1, serves for the purpose of compressing the air as the water is forced in, so that the air-cushion formed therein causes the throwing of a continuous stream of water, and facilitates the working of the pump. The outer air-chamber protects also the working parts of the pump against injury, and renders them thereby more durable.

The pump-barrel is provided at its upper part with overflow-holes $e$, which are connected, by an exit-channel, $f$, along the pump-barrel, to the outside of the air-chamber, so as to discharge any surplus liquid into the receptacle in which the pump is placed, and prevent thus any overflowing or splashing of the liquid at the upper part of the barrel, and the contact of the same with the person working the pump.

In this manner a simple and effective hand-pump for agricultural and domestic purposes is furnished.

Having thus described my invention, I claim as new and desire to secure by Letters Patent—

The combination, in a hand-pump, of a cylindrical pump-barrel, having an exterior surrounding casing and air-chamber, with a solid plunger and with overflow-holes, and with a discharge-pipe passing through the air-chamber, to prevent overflow of liquid, substantially as described.

FRIEDERICH ANDREAS HELMECKE.

Witnesses:
C. L. SCHULZE,
W. SCHOLZ.